United States Patent
Kosaka

(10) Patent No.: US 10,129,486 B2
(45) Date of Patent: Nov. 13, 2018

(54) IMAGE CAPTURING APPARATUS, CONTROL METHOD THEREFOR, AND STORAGE MEDIUM

(71) Applicant: CANON KABUSHIKI KAISHA, Tokyo (JP)

(72) Inventor: Takashi Kosaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/833,096

(22) Filed: Dec. 6, 2017

(65) Prior Publication Data

US 2018/0167545 A1    Jun. 14, 2018

(30) Foreign Application Priority Data

Dec. 13, 2016 (JP) .................. 2016-241596

(51) Int. Cl.

| | |
|---|---|
| *H04N 9/73* | (2006.01) |
| *H04N 5/235* | (2006.01) |
| *H04N 5/232* | (2006.01) |
| *G06K 9/00* | (2006.01) |
| *G03B 7/091* | (2006.01) |
| *G03B 15/00* | (2006.01) |
| *H04N 5/238* | (2006.01) |

(52) U.S. Cl.
CPC .......... *H04N 5/2357* (2013.01); *G03B 7/091* (2013.01); *G03B 15/00* (2013.01); *G06K 9/00* (2013.01); *G06K 9/00221* (2013.01); *H04N 5/232* (2013.01); *H04N 5/235* (2013.01); *H04N 5/238* (2013.01); *H04N 5/2351* (2013.01); *H04N 5/2353* (2013.01); *H04N 5/23212* (2013.01)

(58) Field of Classification Search
CPC ................................ H04N 2/2357
See application file for complete search history.

(56) References Cited

U.S. PATENT DOCUMENTS

| | | | | |
|---|---|---|---|---|
| 5,959,670 A | * | 9/1999 | Tamura | G06T 3/40 348/229.1 |
| 9,225,912 B2 | * | 12/2015 | Yamamoto | H04N 5/235 |
| 9,781,347 B2 | | 10/2017 | Kosaka | |

FOREIGN PATENT DOCUMENTS

JP    2015-159353 A    9/2015

* cited by examiner

*Primary Examiner* — Gary C Vieaux
(74) *Attorney, Agent, or Firm* — Fitzpatrick, Cella, Harper & Scinto

(57) ABSTRACT

An image capturing apparatus includes an image capturing unit; a division photometry unit that detects a brightness of an object in each of a plurality of divided areas; a weighting unit that weights a photometric value of each of the divided areas; an exposure determination unit that determines exposure based on weighting; and a control unit that performs control such that a degree of reflection of the condition of the object on weighting is different between a case where object image capture is performed intermittently by the image capturing unit in order to generate a time-lapse movie, and a case where object image capture is performed by the image capturing unit in order to generate a movie whose ratio of playback time to image capture time is larger than the time-lapse movie.

11 Claims, 6 Drawing Sheets

FIG. 4

|   | 1 | 2 | 3 | 4 | 5 | 6 | 7 | 8 | 9 |
|---|---|---|---|---|---|---|---|---|---|
| 1 | 1 | 1 | 1 | 1 | 1 | 1 | 1 | 1 | 1 |
| 2 | 1 | 1 | 1 | 2 | 2 | 2 | 1 | 1 | 1 |
| 3 | 1 | 1 | 2 | 4 | 8 | 4 | 2 | 1 | 1 |
| 4 | 1 | 1 | 2 | 8 | 12 | 8 | 2 | 1 | 1 |
| 5 | 1 | 1 | 2 | 4 | 8 | 4 | 2 | 1 | 1 |
| 6 | 1 | 1 | 1 | 2 | 2 | 2 | 1 | 1 | 1 |
| 7 | 1 | 1 | 1 | 1 | 1 | 1 | 1 | 1 | 1 |

FIG. 5

|   | 1 | 2 | 3 | 4 | 5 | 6 | 7 | 8 | 9 |
|---|---|---|---|---|---|---|---|---|---|
| 1 | 1 | 1 | 1 | 1 | 1 | 1 | 1 | 1 | 1 |
| 2 | 1 | 6 | 6 | 6 | 1 | 1 | 1 | 1 | 1 |
| 3 | 1 | 6 | 6 | 6 | 1 | 1 | 1 | 1 | 1 |
| 4 | 1 | 6 | 6 | 6 | 1 | 1 | 1 | 1 | 1 |
| 5 | 1 | 1 | 1 | 1 | 1 | 1 | 1 | 1 | 1 |
| 6 | 1 | 1 | 1 | 1 | 1 | 1 | 1 | 1 | 1 |
| 7 | 1 | 1 | 1 | 1 | 1 | 1 | 1 | 1 | 1 |

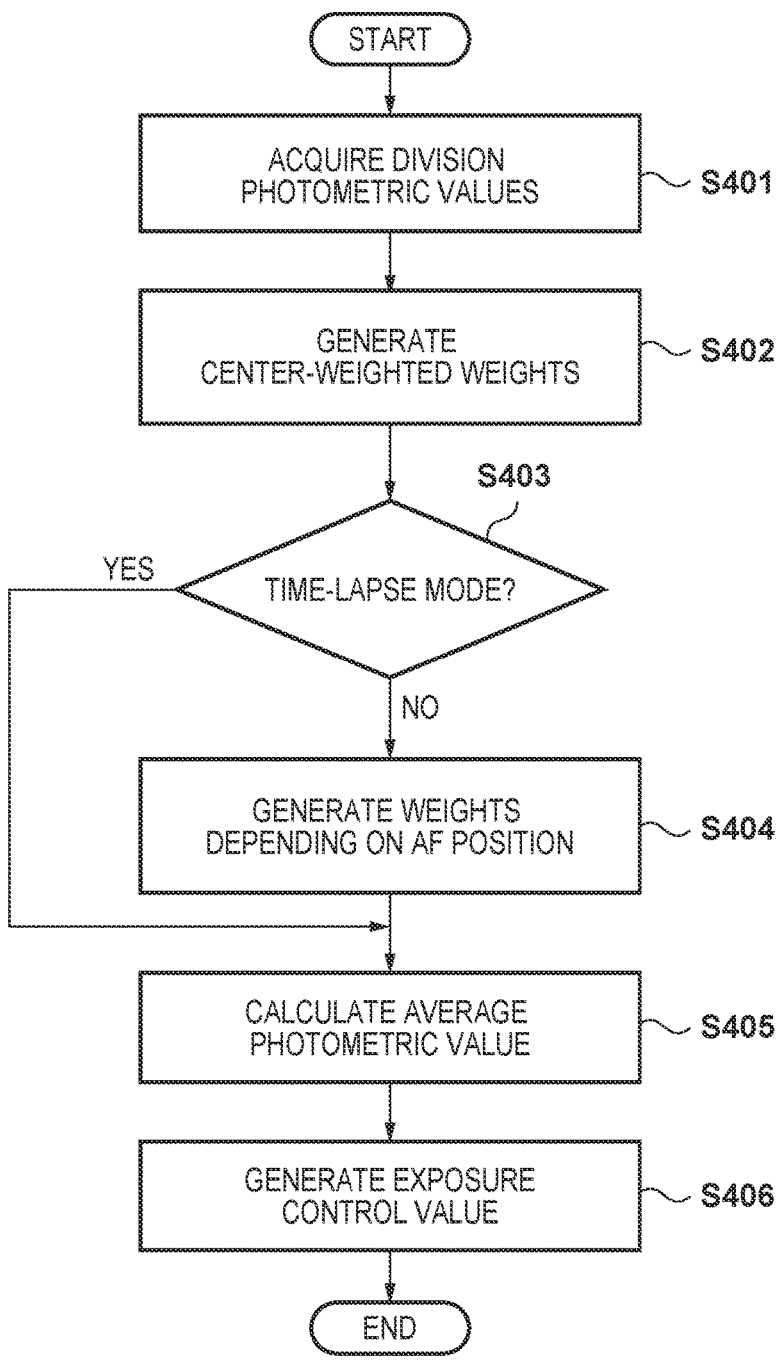

IMAGE CAPTURING APPARATUS, CONTROL METHOD THEREFOR, AND STORAGE MEDIUM

BACKGROUND OF THE INVENTION

Field of the Invention

The present invention relates to technology for shooting a time-lapse movie.

Description of the Related Art

Conventionally known is technology for acquiring a moving image (so-called time-lapse movie) obtained by compressing and recording temporal change in an object by sequentially compositing a plurality of images acquired by intermittently capturing an object.

Fixed exposure control, by which the exposure determined at the time of first image capture is carried over to the later image capture, and automatic exposure control, by which the exposure is computed for every image capture, are known as exposure control in a case where an object is intermittently captured in order to acquire a time-lapse movie. Both types of exposure control can be appropriate and inappropriate to acquisition of a time-lapse movie, and appropriate exposure control changes depending on the object to be shot, the shooting scene, the shooting mode, and the like. For example, fixed exposure control is appropriate when there is a desire to acquire a time-lapse movie of a starry sky or the paths of stars, which is a case where the brightness of ambient light does not significantly change between captures of the object. In contrast, it can be said that automatic exposure control is appropriate when there is a desire to acquire a time-lapse movie of a scene from midday to nighttime including sunset, which is a case where the brightness of ambient light significantly changes during image capture of the object.

Here, when automatic exposure control is performed in time-lapse movie shooting, problems such as the following arise in some cases. That is, if the images that were intermittently acquired have variation in exposure tendency, the brightness of the images changes in a predetermined area in a screen, and thus when the images are reproduced as a movie, this appears as unnatural flickers.

As technology for suppressing flickers in a time-lapse movie, Japanese Patent Laid-Open No. 2015-159353 proposes a method by which disturbance is detected during shooting, and image data in a time slot in which disturbance occurs is removed from the image data for the time-lapse movie.

With the technology proposed in Japanese Patent Laid-Open No. 2015-159353, disturbance is detected by detecting camera shake and a change in illuminance between captured image data. However, with the technology disclosed in Japanese Patent Laid-Open No. 2015-159353, it is difficult to determine whether the change in illuminance is a natural change in the intensity of ambient light or a sudden change in illuminance caused by disturbance, and thus there are cases where image data that is necessary from the viewpoint of a user is removed from the time-lapse movie.

SUMMARY OF THE INVENTION

The present invention acquires a time-lapse movie in which flickers are suppressed without a loss of necessary image data.

According to a first aspect of the present invention, there is provided an image capturing apparatus comprising: an image capturing unit configured to acquire an image by capturing an object image; a division photometry unit configured to detect a brightness of an object in each of a plurality of divided areas corresponding to the image captured by the image capturing unit; a weighting unit configured to weight a photometric value of each of the divided areas in accordance with a condition of the object; an exposure determination unit configured to determine exposure when the image is acquired by the image capturing unit based on weighting performed by the weighting unit; and a control unit configured to perform control such that a degree of reflection of the condition of the object on weighting of the photometric values performed by the weighting unit is different between a case where object image capture is performed intermittently by the image capturing unit in order to generate a time-lapse movie by compositing a plurality of images, and a case where object image capture is performed by the image capturing unit in order to generate a movie whose ratio of playback time to image capture time is larger than the time-lapse movie.

According to a second aspect of the present invention, there is provided a method for controlling an image capturing apparatus provided with an image capturing unit configured to acquire an image by capturing an object image, the method comprising: detecting a brightness of an object in each of a plurality of divided areas corresponding to the image captured by the image capturing unit; weighting a photometric value of each of the divided areas in accordance with a condition of the object; determining exposure when the image is acquired by the image capturing unit based on weighting performed in the weighting; and performing control such that a degree of reflection of the condition of the object on weighting of the photometric values performed in the weighting is different between a case where object image capture is performed intermittently by the image capturing unit in order to generate a time-lapse movie by compositing a plurality of images, and a case where object image capture is performed by the image capturing unit in order to generate a movie whose ratio of playback time to image capture time is larger than the time-lapse movie.

Further features of the present invention will become apparent from the following description of exemplary embodiments with reference to the attached drawings.

BRIEF DESCRIPTION OF THE DRAWINGS

FIG. 4 is a diagram showing an example of weights in photometry in the first embodiment.

FIG. 5 is a diagram showing an example of weights in photometry in the first embodiment.

FIG. 7 is a flowchart showing operations of automatic exposure processing in a third embodiment.

DESCRIPTION OF THE EMBODIMENTS

Hereinafter, embodiments of the present invention will be described in detail with reference to the accompanying drawings.

First Embodiment

Figure 1:
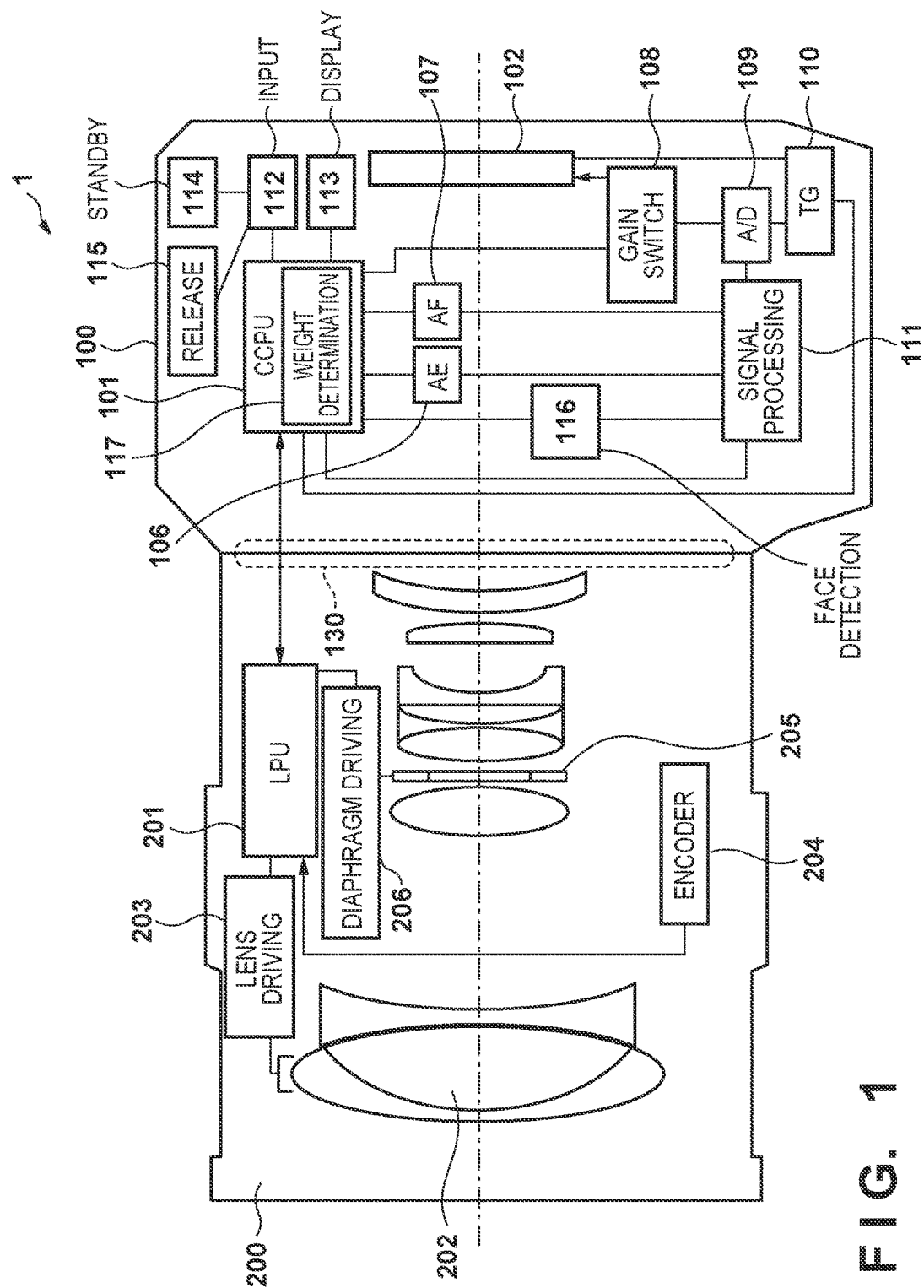
FIG. 1 is a block diagram showing a configuration of a digital camera, which is a first embodiment of an image capturing apparatus of the present invention.

FIG. 1 is a block diagram showing a configuration of a digital camera (hereinafter, simply referred to as "camera") 1, which is a first embodiment of an image capturing apparatus of the present invention. The camera 1 is constituted by interchangeably mounting a lens unit 200 (imaging optical system) on a camera main body 100. Note that one or more of the functional blocks shown in FIG. 1 may be realized by hardware such as ASIC or a programmable logic array (PLA), or may be realized by a programmable processor such as a CPU or an MPU executing software. Also, they may be realized by a combination of software and hardware. Thus, in the description below, even if different functional blocks are mentioned as operation subjects, the same hardware may be realized as the subject. Note that as shown in FIG. 1, the camera 1 of the present embodiment is a lens interchangeable image capturing apparatus provided with the camera main body 100 and an interchangeable lens type lens unit 200, but is not limited to this. For example, the camera 1 may be an image capturing apparatus obtained by integrally constituting the camera main body 100 and the lens unit 200.

Basic Configuration of Image Capturing Apparatus

First, the configuration of the camera main body 100 will be described. In FIG. 1, a CCPU (hereinafter, camera microcomputer) 101 constituted by a microcomputer is a system control circuit that controls portions of the image capturing apparatus 100. The camera microcomputer 101 not only controls the system of an image capturing apparatus but also makes various condition determinations. An image capturing element 102 is constituted by a CCD, a CMOS sensor, or the like that includes an infrared cut filter, a lowpass filter, and the like, and an object image is formed by a lens group 202, which will be described later. A photometric circuit 106 computes signals of images captured by the image capturing element 102 in cooperation with a digital signal processing circuit 111, and performs photometric control. The photometric circuit 106 includes a division photometry circuit that divides an image capture area into a predetermined number of areas and outputs an illuminance value of each of the divided areas, and an exposure control value determination circuit that determines an exposure control value from the results of division photometry.

A focus detection circuit 107 computes data of images that were captured by the image capturing element 102 in cooperation with the digital signal processing circuit 111, and performs focus detection control. A gain switch circuit 108 switches the gain of amplification of signals of the image capturing element 102. Switching of gain is controlled by the camera microcomputer 101 using shooting conditions, input from a shooter, and the like. An A/D converter 109 converts amplified analog signals from the image capturing element 102 to digital signals. A timing generator (TG) 110 generates a timing signal for synchronizing input of the amplified signals from the image capturing element 102 and a conversion time of the A/D converter 109. The digital signal processing circuit 111 processes the image data that has been converted to the digital signals by the A/D converter 109 in accordance with parameters. Note that although not shown, the camera main body 100 also has a storage means such as a memory that stores the processed images.

A lens mount 130 is an interface between the camera microcomputer 101 and a lens microcomputer 201, which will be described later, and has a communication terminal for communicating data between the lens microcomputer 201 and the camera microcomputer 101. This communication terminal enables communication between the camera microcomputer 101 and the lens microcomputer 201. Also, this communication makes it possible to judge the type of lens unit and various states of lens units with the camera microcomputer 101 in the camera main body 100.

An input unit 112 includes a shooting standby button 114 that puts the image capturing apparatus in a time-lapse movie shooting standby state, a release button (SW1, SW2) 115, switches and buttons for switching AF area selection modes and multi-point/face tracking modes (not shown), and the like. Also, the input unit 112 includes a dial for switching shooting modes including a shutter speed priority mode and an aperture priority mode and the like, and it is possible to externally input the settings of the camera. A display unit 113 is constituted by a light emitting element and a liquid crystal apparatus that displays various modes that have been set, other shooting information, and the like.

A face detection circuit 116 detects whether or not the face of a person is present, from signals of an image captured by the image capturing element 102, as the condition of an object, in cooperation with the digital signal processing circuit 111. The face detection circuit 116 specifies the number of faces, the position and the size of each face, the orientation of each face, and the like in the image signals. In the present embodiment, as the face detection method, a face area is specified by extracting, from the image signals, feature portions of the faces, such as eyes, noses, and mouths. However, other methods may be used such as a method by which skin color data is extracted, and an area that is determined as the skin color range is regarded as the face area, and a method utilizing elliptical shape information that focuses on the outlines of a face.

A weighting determination circuit 117 determines a weight for each of the divided areas in the results of division photometry performed by the photometric circuit 106. These determination results are used in photometric control performed in the photometric circuit 106. Details of the determination method will be described later.

Next, a configuration and operations of the lens unit 200 will be described. In FIG. 1, an LPU (hereinafter, a lens microcomputer) 201, which is a microcomputer, controls operations of portions of the lens unit 200. The lens microcomputer 201 also controls the lens and makes various condition determinations. A lens group 202 is constituted by a plurality of lenses, and forms an object image. The lens group 202 includes a focus lens that moves in the optical axis direction so as to adjust the focus.

A lens driving unit 203 moves the optical system of the lens group 202 for focus detection and focus positioning. A driving amount of the lens group 202 is calculated in the camera microcomputer 101 based on the output of the focus detection circuit 107 in the camera main body 100. An encoder 204 detects the position at the time of driving the lens group 202. Note that the calculated driving amount of the lens group 202 is communicated from the camera microcomputer 101 to the lens microcomputer 201. Then, the lens microcomputer 201 operates the lens driving portion 203 by the driving amount according to the driving information of the encoder 204, and the lens group 202 is moved to the focus position. Also, during focus detection, the driving direction and the driving speed are communicated from the camera microcomputer 101 to the lens microcomputer 201, and the lens group 202 is driven so as to be suitable for focus detection.

A diaphragm 205 is used to adjust the quantity of light. A diaphragm driving circuit 206 drives the diaphragm 205. The lens microcomputer 201 controls driving of the diaphragm 205 by controlling the diaphragm driving circuit 206. The camera microcomputer 101 notifies the lens microcomputer 201 of a diaphragm driving amount required to control the diaphragm 205, through communication. Note that the focal length of the lens group 202 may be fixed, as with a single focus lens, or may be variable, as with a zoom lens.

Time-Lapse Movie Shooting

Hereinafter, operations during time-lapse movie shooting will be described with reference to the flowchart of FIG. 2. Note that each process in the flowchart shown in FIG. 2 is executed by operating portions of the camera 1 in accordance with the instruction given from the camera microcomputer 101.

The term time-lapse movie refers to a movie obtained by compositing, in chronological order, data of a plurality of images acquired through intermittent image capture (time-lapse shooting) at predetermined time intervals, and temporal change in an object can be viewed in a short time. This time-lapse movie has a shorter playback time than the total image capture time period required to acquire the data of the plurality of images that are used to generate this time-lapse movie.

Figure 2:
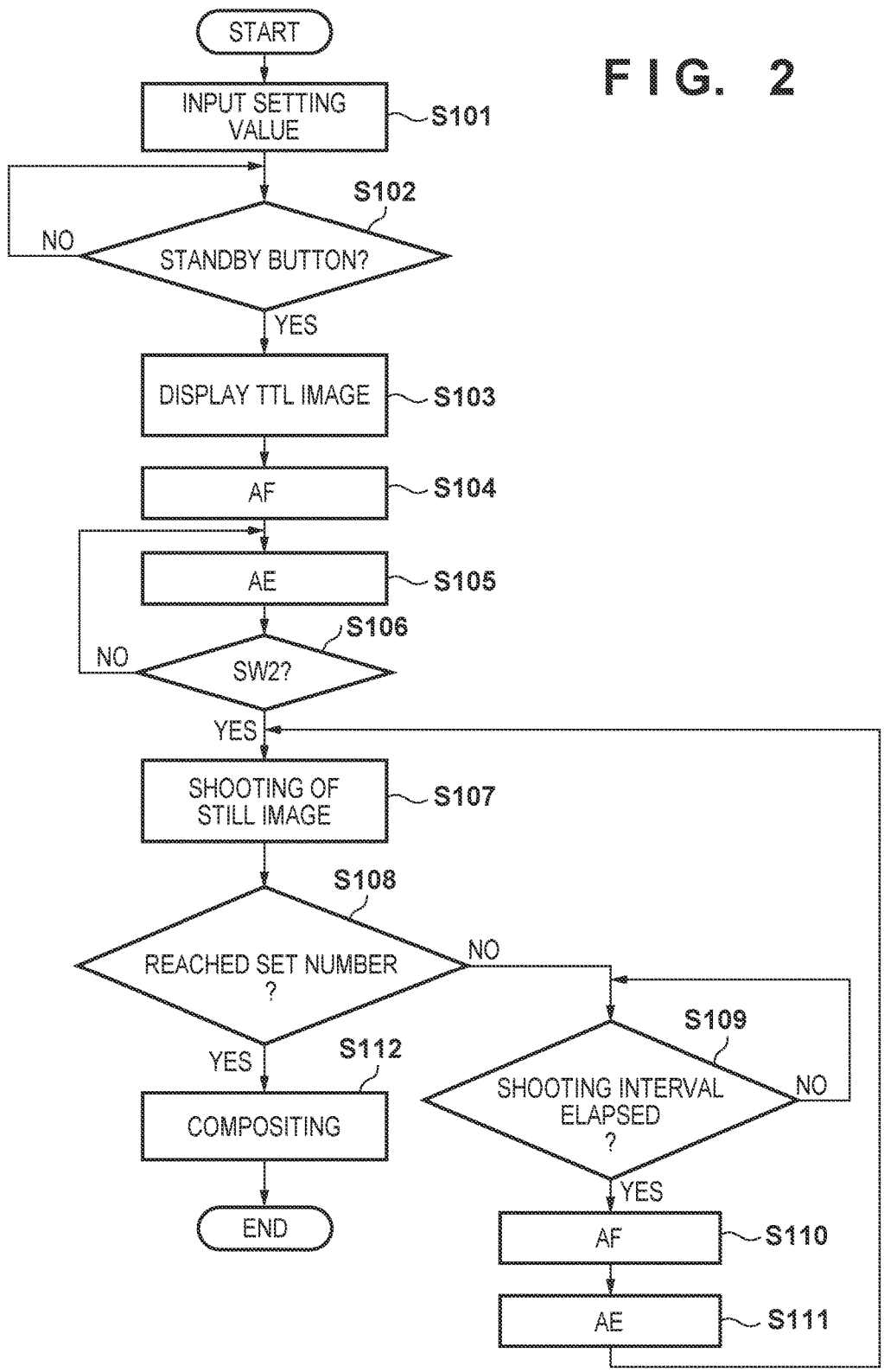
FIG. 2 is a flowchart showing operations at the time of time-lapse shooting in the first embodiment.

In FIG. 2, in step S101, a user sets, using the input unit 112, an intermittent image capture interval and the number of instances of image capture in time-lapse movie shooting. The user may be able to select the image capture interval from among options that are prepared in advance, or set the image capture interval to any arbitrary value. Also, a configuration may be adopted in which a mode is selected in accordance with shooting purposes, such as an evening scene time-lapse mode, a starry sky time-lapse mode, and a walk lapse mode, and the camera main body 100 selectively determines the image capture interval and the number of instances of image capture in accordance with the selected mode.

Next, in step S102, when a time-lapse movie shooting standby button is operated, the camera moves to the time-lapse movie shooting standby state. In step S103, the camera is in the time-lapse movie shooting standby state, and images captured by the image capturing element 102 are displayed on the display unit 113 as through-the-lens images. Next, AF (automatic focus) processing with use of the focus detection circuit 107 is performed in step S104, and thereafter, AE (automatic exposure) processing with use of the photometric circuit 106 is performed in step S105. Details of the AE processing will be described later. In the time-lapse movie shooting standby state, detection of exposure states (conditions) that are optimal to actual shooting continues until the actual shooting instruction is given.

In step S106, when the input of the release button 115 is detected, actual time-lapse image capture is started. In step S107, an object is captured and still images (recorded images) that are used to generate a time-lapse movie are acquired. Signals of the images that are formed by the lens unit 200 and photoelectrically converted by the image capturing element 102 are processed by the A/D converter 109 and then output as image data from the digital signal processing circuit 111. Then, this image data is temporarily stored in a predetermined memory.

In step S108, it is determined whether or not the number of instances of image capture for acquiring the above-described recorded images has reached the preset number of instances of image capture. When the number has reached the preset number, the processing advances to step S112, and pieces of data of the plurality of images that were intermittently captured are combined by the digital signal processing unit 111 and are converted to the format of a movie, and then recorded as the time-lapse movie. Then, time-lapse movie shooting ends. When the number has not reached the preset number of instances of image capture, the processing advances to step S109.

In step S109, the camera 1 waits until the set time interval elapses. When the set time period has elapsed, the processing advances to step S110 and the AF processing is performed again. Thereafter, the processing advances to step S111 and AE processing is performed, and hereinafter, processing from step S107 onward is repeated.

Note that although the configuration in which the time-lapse movie is generated in the camera 1 was described in the present embodiment, the present invention is not limited to this. For example, a configuration may be adopted in which a time-lapse movie is generated by an electronic device provided outside the camera 1 composing images for a time-lapse movie that were acquired by the camera 1.

AE Processing

Figure 3:
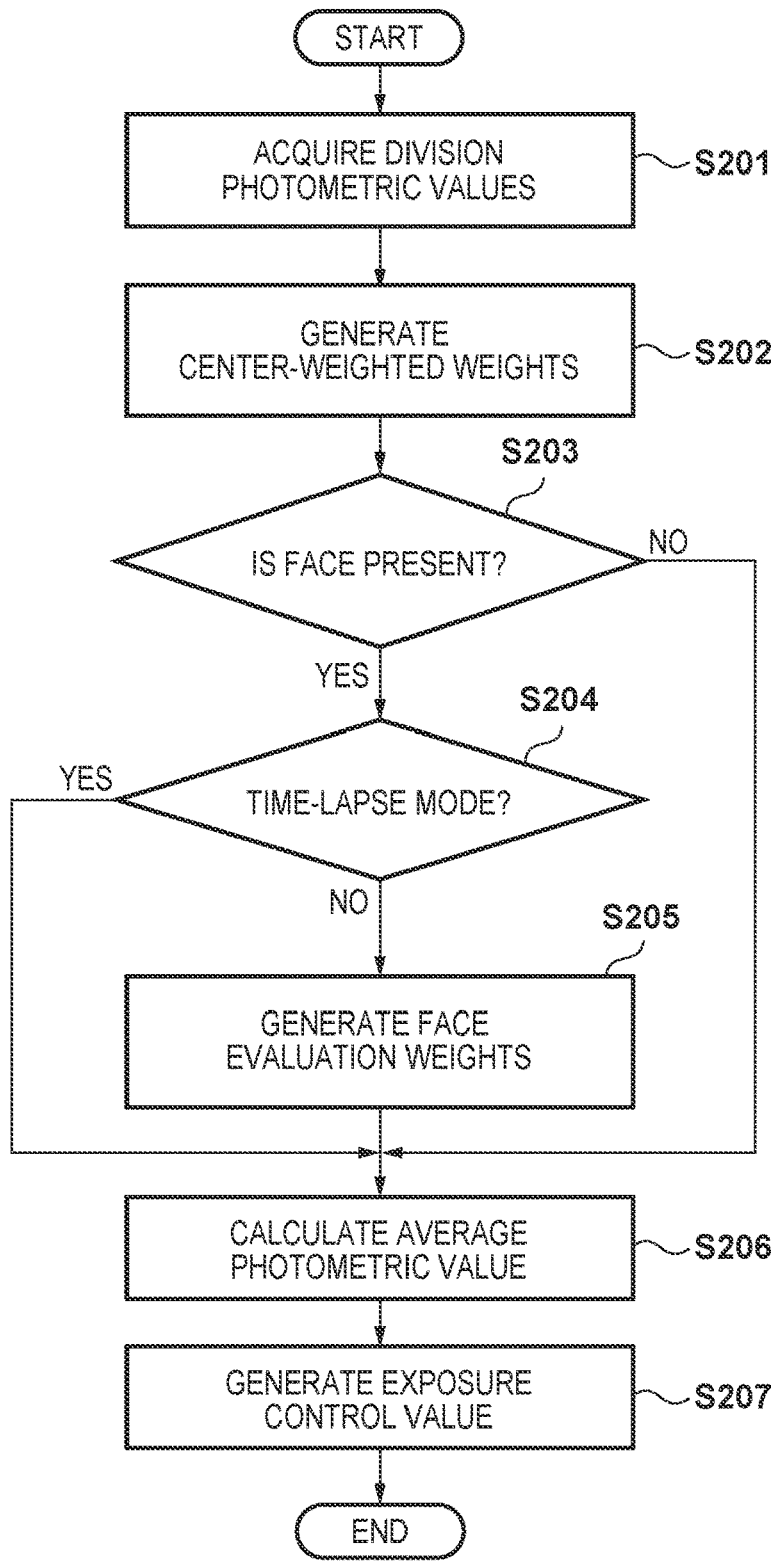
FIG. 3 is a flowchart showing operations of automatic exposure processing in the first embodiment.

Hereinafter, details of AE processing in the first embodiment of the present invention will be described with reference to the flowchart in FIG. 3. Note that each process in the flowchart shown in FIG. 3 is executed by operating portions of the camera 1 in accordance with the instruction given from the camera microcomputer 101.

First, division photometric values are acquired in step S201. The division photometric values are output by the division photometric circuit in the photometric circuit 106, and as shown in FIG. 4, the division photometric values are acquired as the illuminance value of each of the divided areas obtained by dividing a shooting area into 63 (9×7) areas.

In step S202, center-weighted average photometry is selected as the photometric algorithm at the time of initial exposure control, and a ratio of weights between the center of a screen and its periphery is determined. This photometric algorithm is selected by the camera microcomputer 101 in the case of a shooting mode in which time-lapse movie shooting and movie shooting are performed. With center-weighted average photometry, photometric values are measured in average in a relatively wide range while placing a weight in the screen center. The weights of the divided areas (the degree of weights) at this time are shown as numerical values in FIG. 4. In this example, the ratio between a central area and an end area of the screen is 12:1. That is, the weight of the central portion is approximately 12 times that of the end portion in the image data.

Face detection is performed by the face detection circuit 116 in step S203. Here, the number of detected faces, the position of each face, the priority of faces, and the like are specified and stored. Here, when a face is detected, the processing advances to step S204, whereas when no face is detected, the processing advances to step S206.

In step S204, it is determined whether or not the camera 1 is in the time-lapse movie shooting state. "Time-lapse movie shooting state" means the time-lapse movie shooting standby state or a state between instances of actual time-lapse shooting. In the case where the camera is not in the time-lapse movie shooting state and normal still image or movie shooting is being performed, the processing advances to step S205, whereas in the case where the camera is in the time-lapse movie shooting state, the processing skips the step of weighting a face area in step S205 and advances to step S206. This is because if the face area is weighted in the time-lapse movie shooting, the exposure changes between a frame in which a face is present in the screen and a frame in which no face is present, and when frames are combined as the time-lapse movie, the resulting images appear to flicker. Thus, in the present embodiment, the results of face detection are not reflected in the exposure at the time of time-lapse movie shooting.

In step S205, weights are set based on an evaluation photometric algorithm that increases the weight of a division photometric value for the coordinates of the face detected in step S203. An example of weights of face areas is shown in FIG. 5. In FIG. 5, 9 blocks centered on the coordinates of the face are set as a face evaluation area, and the weight ratio of the face evaluation area to the other areas is 6:1. Thereafter, the processing advances to step S206. Note that the weight ratio of this face area is not limited to this value, and weights may be changed in accordance with the shooting mode and the scene. For example, it is conceivable that with the scenery shooting mode, the face detection results are not used (alternatively, the weight is set to 0), whereas with the portrait mode, the weight of the face area is increased. Also, it is conceivable that during walk-lapse shooting during which a user holds the camera with his/her hand and shoots a time-lapse movie, there is a high possibility of shooting a person, and thus the weight of the face area is increased, for example.

In step S206, an average photometric value is calculated based on the weight of each division photometric area and the results of division photometry so far. When the face evaluation step in step S205 is skipped, photometric values are averaged in accordance with the weight ratio obtained in step S202. Skipping the face evaluation step at the time of time-lapse movie shooting makes it possible to exclude the influence of faces in the shooting angle of view with regard to the exposure in the frames that are combined as the time-lapse movie. When the face evaluation step is implemented in step S205, photometric values are averaged in accordance with the weights at the time of face evaluation. Also, a combination of center-weighted weighting in step S202 and face evaluation weighting in step S205 may be used. When the results of average photometry have been output, the processing advances to step S207.

In step S207, exposure parameters such as TV (shutter speed), AV (aperture value), and SV (shooting sensitivity) for shooting are generated based on the results of photometry. Here, the method for generating exposure parameters changes depending on whether the camera is in the standby state or shooting state in time-lapse movie shooting. The standby exposure parameters are generated by AE processing that is performed before actual shooting of a time-lapse movie, as in the processing in step S105 in FIG. 2. In this case, exposure computation is performed based on program AE. With program AE, TV, AV, and SV are determined in accordance with the illuminance values obtained based on the results of average photometry. With regard to TV, a time in units of seconds (for example, 1/60 seconds) at which camera shake is unlikely to occur is defined, and AV and SV are controlled such that this defined time is not exceeded. For example, when a dark object is captured, TV is set to 1/60 seconds, AV is shifted toward the open side, and SV is shifted toward the high sensitivity side. Then, when AV reaches the open value and SV reaches the limit on the high sensitivity side, TV on a longer second side is selected.

On the other hand, the exposure parameters during shooting are generated in the processing shown in step S111 in FIG. 2, between instances of actual shooting of the time-lapse movie. In this case, exposure computation is performed based on aperture priority AE. Exposure is adjusted using the AV (aperture value) obtained when the first frame of the time-lapse movie was shot as is, and using TV (shutter speed) and SV (shooting sensitivity). This is because when a plurality of frame images that were captured are combined as the time-lapse movie, if the aperture changes between frames, flickering appears during playback due to a difference in the depth of field, the degree of a decrease in the ambient light intensity, and the like.

Note that the number of divided photometric areas and the details of weighting that were described above are merely examples, and are not particularly limited to the above-described values.

As described above, in the present embodiment, fixed weighting is applied to the determination of the exposure of frames of a time-lapse movie, without using face information. Accordingly, it is possible to shoot a time-lapse movie from which no necessary image data is lost, while also excluding influences on the exposure for the time-lapse movie caused by whether a face is present between frames, a change in the face position, false face detection, or a fluctuation in the detection results near the limit of detection capability.

Second Embodiment

Figure 6:
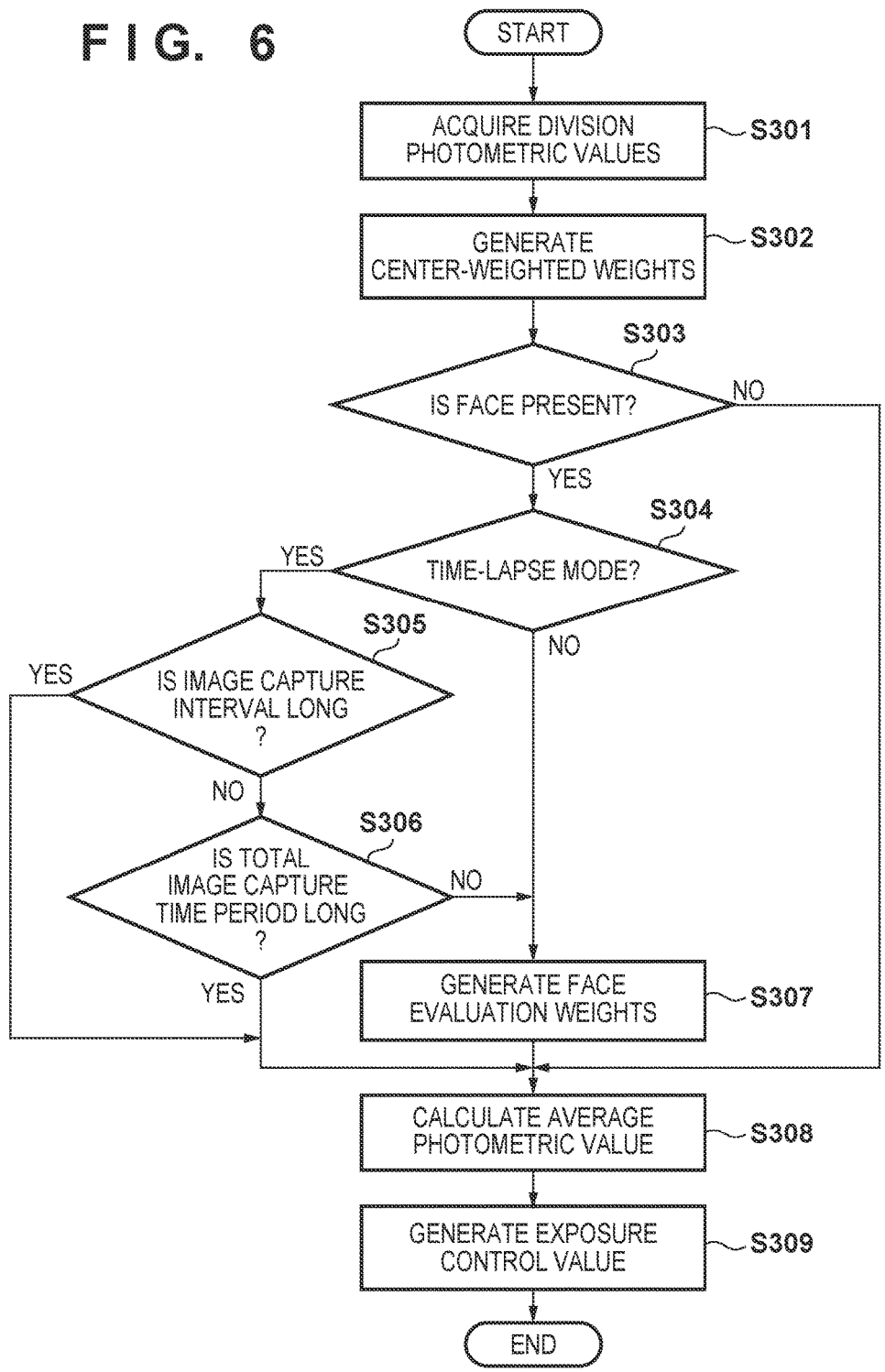
FIG. 6 is a flowchart showing operations of automatic exposure processing in a second embodiment.

Hereinafter, details of AE processing in a second embodiment of the present invention will be described with reference to the flowchart in FIG. 6. Note that each process in the flowchart shown in FIG. 6 is executed by operating portions of the camera 1 in accordance with the instruction given from the camera microcomputer 101. Also, the processing from step S301 to step S304 is the same as that from step S201 to step S204 in FIG. 3, and thus description thereof is omitted.

In step S305, the interval between instances of actual shooting in time-lapse movie shooting is determined. The image capture interval is a setting value set in step S101 in FIG. 2. The set image capture interval is compared with a predetermined time interval, and if the set image capture interval is longer than the predetermined time interval, step S306 and step S307 are skipped, and the processing advances to step S308. An example of the predetermined time interval is a relatively short time period such as about 10 seconds.

In step S306, the total image capture time period starting from the start to the end of the time-lapse movie shooting is determined. The total image capture time period can be obtained based on the image capture interval and the number of instances of image capture that are set in step S101 in FIG. 2. The obtained total image capture time period is compared with a predetermined time period, and if the total image capture time period is longer than the predetermined time period, step S307 is skipped, and the processing advances to step S308. An example of the predetermined time period is a relatively short time period such as about 5 minutes, in which it is determined that the scene does not change.

In step S307, weights are set based on an evaluation photometric algorithm that increases the weight of the division photometric value for the coordinates of the detected face. The processing from step S308 onward is the same as that from step S206 in FIG. 3 onward, and thus description thereof is omitted.

As described above, in the present embodiment, in the time-lapse mode, when the image capture interval or the total image capture time period starting from the initial image capture to the final image capture is long, fixed weighting is applied to determine exposure for every image capture without using face information. With this configuration, exposure weighting for face areas can be changed in accordance with the image capture interval or the total image capture time period. Thus, in a condition where the image capture interval or the total image capture time period is relatively short and the ambient light changes little, by setting exposure weighting for face areas, exposure control can be performed such that a face area that is most likely a main object has an appropriate brightness. In contrast, in a condition where the image capture interval or the total image capture time period is relatively long and the ambient light changes significantly, exposure weighting for face areas is not set, thus suppressing the occurrence of unnatural flickers in a time-lapse movie that is caused by the influence of a face area that is less likely a main object. With the above-described configuration, the camera 1 of the present embodiment can acquire a time-lapse movie from which no necessary image data is lost, while also suppressing the case where the time-lapse movie is influenced by a difference in exposure control resulting from whether or not faces are present in image data.

Third Embodiment

Hereinafter, details of AE processing in a third embodiment of the present invention will be described with reference to the flowchart in FIG. 7. Note that each process in the flowchart shown in FIG. 7 is executed by operating portions of the camera 1 in accordance with the instruction given from the camera microcomputer 101.

First, division photometric values are acquired in step S401. Next, in step S402, center-weighted average photometry is selected as the photometric algorithm at the time of initial exposure control, and weights of the division photometric values are determined. With center-weighted average photometry, photometric values are measured in average in a relatively wide range while placing a weight in the screen center. Thereafter, the processing advances to step S403.

In step S403, it is determined whether or not the camera 1 is in the time-lapse movie shooting state. "Time-lapse movie shooting state" means the time-lapse movie shooting standby state or a state between instances of actual time-lapse shooting. In the case where the camera is not in the time-lapse movie shooting state and normal still image or movie shooting is being performed, the processing advances to step S404, whereas in the case where the camera is in the time-lapse movie shooting state, step S404 is skipped and the processing advances to step S405.

In step S404, weights are set based on an evaluation photometric algorithm that increases the weight of a division photometric value for the focus detection position. An example of weights of the focus detection position is shown in FIG. 5. In FIG. 5, 9 blocks centered on the focus detection position are set as a main focus detection area, and the weight ratio of the main focus detection area to the other areas is 6:1. The focus detection position is an AF position used in AF processing implemented in step S104 and step S110 in FIG. 2, and there is a case where the focus detection position is set by the input unit 112 and a case where the focus detection position is automatically selected by the image capturing apparatus during the AF processing. When the focus detection position is selected automatically, determination is made by the focus detection circuit 107 in the focus detection processing, and a known technique is used for the determination algorithm, such as tracking of object detection results typified by close object priority or face detection above. Thereafter, the processing advances to step S405.

In step S405, an average photometric value is calculated based on the weight of each division photometric area and the results of division photometry so far. When evaluation photometry in the main focus detection area in step S404 is skipped, photometric values are averaged in accordance with the weight ratio obtained in step S402. Skipping the focus detection position evaluation step at the time of time-lapse movie shooting makes it possible to exclude the influence of movement of an object in the shooting angle of view with regard to the exposure when recorded images that are to be combined as the time-lapse movie are acquired, and the influence of variation in the focus detection positions in the object plane. When the main focus detection area evaluation step is implemented in step S404, photometric values are averaged in accordance with the weights of the focus detection positions. Also, a combination of center-weighted weighting in step S402 and weighting focused on the main focus detection area in step S404 may be used. When the results of average photometry have been output, the processing advances to step S406.

In step S406, exposure parameters such as TV (shutter speed), AV (aperture value), SV (shooting sensitivity) for shooting are generated based on the results of photometry. The processing content is as described above, and thus description thereof is omitted.

As described above, in the present embodiment, fixed weighting is applied to the determination of the exposure of images for generating the time-lapse movie, without using focus detection position information. Accordingly, it is possible to shoot a time-lapse movie from which no necessary image data is lost, while also excluding influences on movie exposure that are caused by a change in the position of an object between frames or fluctuation in AF frames.

Note that similarly to the second embodiment, when the shooting frame interval or the shooting required time period starting from the first frame to the last frame is long, fixed weighting may be applied without using the focus detection position information in the determination of exposure for frames of a time-lapse movie.

Although preferred embodiments of the present invention were described above, the present invention is not limited to these embodiments, and various modifications and changes can be made within the scope of the gist of the invention. For example, a configuration in which in the time-lapse mode, weighting is not set in predetermined areas such as a face area and a focus detection area was described in the above-described embodiments, but the present invention is not limited to this. A configuration may be adopted in which exposure weighting in a predetermined area is changed at least between the time-lapse mode and the image capture mode with which a normal movie is acquired. Specifically, a configuration may be adopted in which exposure weighting in a predetermined area is set smaller in the time-lapse mode than in the image capture mode with which a normal movie is acquired. Note that compared to the time-lapse mode, the image capture mode with which a normal movie is acquired has a larger ratio of the playback time to the total image capture time period during which the same move is acquired.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-241596, filed Dec. 13, 2016, which is hereby incorporated by reference herein in its entirety.

What is claimed is:

1. An image capturing apparatus comprising:
an image capturing unit configured to acquire an image by capturing an object image; and
at least one of (a) circuitry and (b) at least one processor, configured to function as units comprising:
(1) a division photometry unit configured to detect a brightness of an object in each of a plurality of divided areas corresponding to the image captured by the image capturing unit;
(2) a weighting unit configured to weight a photometric value of each of the divided areas in accordance with a condition of the object;
(3) an exposure determination unit configured to determine exposure when the image is acquired by the image capturing unit based on weighting performed by the weighting unit; and
(4) a control unit configured to perform control such that a degree of reflection of the condition of the object on weighting of the photometric values performed by the weighting unit is different between a case where object image capture is performed intermittently by the image capturing unit in order to generate a time-lapse movie by compositing a plurality of images, and a case where object image capture is performed by the image capturing unit in order to generate a movie whose ratio of playback time to image capture time is larger than the time-lapse movie.

2. The image capturing apparatus according to claim 1, wherein the at least one of (a) circuitry and (b) at least one processor is configured to further function as a face detection unit configured to detect a face of the object, and
wherein the weighting unit weights a photometric value of each of the divided areas in accordance with whether or not the face is present as the condition of the object.

3. The image capturing apparatus according to claim 2, wherein in the case where object image capture is performed intermittently, the control unit controls the weighting unit so as to prevent reflection of presence or absence of the face on weighting of the photometric values of the divided areas.

4. The image capturing apparatus according to claim 2, wherein in the case where object image capture is performed intermittently, when a predetermined time interval at which the image capturing unit acquires an image is longer than a first predetermined time period, the control unit controls the weighting unit so as to prevent reflection of presence or absence of the face on weighting of the photometric values of the divided areas.

5. The image capturing apparatus according to claim 2, wherein in the case where object image capture is performed intermittently, when a total image capture time for acquiring a single time-lapse movie is longer than a second predetermined time period, the control unit controls the weighting unit so as to prevent reflection of presence or absence of the face on weighting of the photometric values of the divided areas.

6. The image capturing apparatus according to claim 1, wherein the at least one of (a) circuitry and (b) at least one processor is configured to further function as a focus detection unit configured to detect a focus position of an imaging optical system, and
wherein the weighting unit weights a photometric value of each of the divided areas in accordance with a position of a focus detection area detected by the focus detection unit as the condition of the object.

7. The image capturing apparatus according to claim 6, wherein in the case where object image capture is performed intermittently, the control unit controls the weighting unit so as to prevent reflection of the position of the focus detection area on weighting of the photometric values of the divided areas.

8. The image capturing apparatus according to claim 6, wherein in the case where object image capture is performed intermittently, when a predetermined time interval at which the image capturing unit acquires an image is longer than a first predetermined time period, the control unit controls the weighting unit so as to prevent reflection of the position of the focus detection area on weighting of the photometric values of the divided areas.

9. The image capturing apparatus according to claim 6, wherein in the case where object image capture is performed intermittently, when a shooting required time period is longer than a second predetermined time period, the control unit controls the weighting unit so as to prevent reflection of the position of the focus detection area on weighting of the photometric values of the divided areas.

10. A method for controlling an image capturing apparatus provided with an image capturing unit configured to acquire an image by capturing an object image, the method comprising:
- detecting a brightness of an object in each of a plurality of divided areas corresponding to the image captured by the image capturing unit;
- weighting a photometric value of each of the divided areas in accordance with a condition of the object;
- determining exposure when the image is acquired by the image capturing unit based on weighting performed in the weighting; and
- performing control such that a degree of reflection of the condition of the object on weighting of the photometric values performed in the weighting is different between a case where object image capture is performed intermittently by the image capturing unit in order to generate a time-lapse movie by compositing a plurality of images, and a case where object image capture is performed by the image capturing unit in order to generate a movie whose ratio of playback time to image capture time is larger than the time-lapse movie.

11. A non-transitory computer-readable storage medium storing a program for causing a computer to execute steps of a method for controlling an image capturing apparatus provided with an image capturing unit configured to acquire an image by capturing an object image, the method comprising:
- detecting a brightness of an object in each of a plurality of divided areas corresponding to the image captured by the image capturing unit;
- weighting a photometric value of each of the divided areas in accordance with a condition of the object;
- determining exposure when the image is acquired by the image capturing unit based on weighting performed in the weighting; and
- performing control such that a degree of reflection of the condition of the object on weighting of the photometric values performed in the weighting is different between a case where object image capture is performed intermittently by the image capturing unit in order to generate a time-lapse movie by compositing a plurality of images, and a case where object image capture is performed by the image capturing unit in order to generate a movie whose ratio of playback time to image capture time is larger than the time-lapse movie.

* * * * *